(12) United States Patent
Kim et al.

(10) Patent No.: US 9,521,008 B2
(45) Date of Patent: Dec. 13, 2016

(54) METHOD AND DEVICE FOR RECEIVING A MULTIMEDIA BROADCAST MULTICAST SERVICE IN A MOBILE COMMUNICATION SYSTEM

(71) Applicant: Samsung Electronics Co., Ltd., Suwon-si, Gyeonggi-do (KR)

(72) Inventors: Soeng-Hun Kim, Yongin-si (KR); Kyeong-In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 14/347,854

(22) PCT Filed: Oct. 10, 2012

(86) PCT No.: PCT/KR2012/008208
§ 371 (c)(1),
(2) Date: Mar. 27, 2014

(87) PCT Pub. No.: WO2013/055099
PCT Pub. Date: Apr. 18, 2013

(65) Prior Publication Data
US 2014/0233452 A1 Aug. 21, 2014

Related U.S. Application Data

(60) Provisional application No. 61/545,363, filed on Oct. 10, 2011, provisional application No. 61/552,114, (Continued)

(30) Foreign Application Priority Data

Oct. 10, 2012 (KR) ........................ 10-2012-0112390

(51) Int. Cl.
*H04H 20/71* (2008.01)
*H04L 12/18* (2006.01)
(Continued)

(52) U.S. Cl.
CPC ......... *H04L 12/189* (2013.01); *H04L 12/1881* (2013.01); *H04W 36/06* (2013.01);
(Continued)

(58) Field of Classification Search
None
See application file for complete search history.

(56) References Cited

U.S. PATENT DOCUMENTS

2004/0180675 A1 9/2004 Choi et al.
2004/0202140 A1 10/2004 Kim et al.
(Continued)

FOREIGN PATENT DOCUMENTS

CN 1738486 A 2/2006
CN 101668250 A 3/2010
(Continued)

OTHER PUBLICATIONS

Nokia Corporation et al., RACH and carrier aggregation, 3GPP TSG-RAN WG2 Meeting #68, R2-096844, Nov. 9-13, 2009, Jeju, South Korea.

(Continued)

*Primary Examiner* — Minh-Trang Nguyen
(74) *Attorney, Agent, or Firm* — Jefferson IP Law, LLP

(57) ABSTRACT

The present invention relates to a method and device for receiving a multimedia broadcast multicast service (MBMS) in a mobile communication system. The method for receiving the MBMS of a terminal in the mobile communication system according to an embodiment of the present invention is characterized in that it includes: determining whether service area ID (SAI) information on a serving cell is broadcast during the MBMS; receiving the SAI information on the serving cell when it is determined that the SAI information is broadcast; determining, by using the received SAI information of the serving cell, whether an SAI of the
(Continued)

MBMS matches the SAI of the serving cell; and changing the cell reselection priority of the frequency of the serving cell to the highest priority if it is determined that the SAI of the MBMS matches the SAI of the serving cell. According to the present invention, it is possible to efficiently receive MBMS services by enabling a terminal to select a proper frequency or cell when an MBMS service of interest starts.

8 Claims, 11 Drawing Sheets

Related U.S. Application Data filed on Oct. 27, 2011, provisional application No. 61/559,674, filed on Nov. 14, 2011, provisional application No. 61/563,345, filed on Nov. 23, 2011, provisional application No. 61/595,646, filed on Feb. 6, 2012, provisional application No. 61/600,179, filed on Feb. 17, 2012.

(51) Int. Cl.
| | |
|---|---|
| H04W 36/06 | (2009.01) |
| H04W 4/06 | (2009.01) |
| H04W 72/00 | (2009.01) |
| H04W 48/18 | (2009.01) |
| H04W 36/22 | (2009.01) |
| H04W 76/00 | (2009.01) |

(52) U.S. Cl.
CPC ............. *H04W 4/06* (2013.01); *H04W 36/22* (2013.01); *H04W 48/18* (2013.01); *H04W 72/005* (2013.01); *H04W 76/002* (2013.01)

(56) References Cited

U.S. PATENT DOCUMENTS

| | | |
|---|---|---|
| 2005/0090278 A1 | 4/2005 | Jeong et al. |
| 2006/0023664 A1 | 2/2006 | Jeong et al. |
| 2008/0287129 A1 | 11/2008 | Somasundaram et al. |
| 2010/0296467 A1 | 11/2010 | Pelletier et al. |
| 2011/0103328 A1 | 5/2011 | Lee et al. |
| 2011/0116433 A1* | 5/2011 | Dorenbosch ........ H04W 72/005 370/312 |
| 2012/0236776 A1* | 9/2012 | Zhang ................. H04W 48/12 370/312 |
| 2013/0039250 A1* | 2/2013 | Hsu ........................ H04H 20/71 370/312 |
| 2014/0153474 A1 | 6/2014 | Zhao et al. |

FOREIGN PATENT DOCUMENTS

| | | |
|---|---|---|
| EP | 2 728 913 A1 | 5/2014 |
| KR | 10-2005-0015729 A | 2/2005 |
| KR | 10-2005-0032953 A | 4/2005 |
| KR | 10-2009-0019868 A | 2/2009 |
| KR | 10-2010-0017513 A | 2/2010 |
| KR | 10-2010-0051906 A | 5/2010 |
| RU | 2262811 C2 | 10/2005 |
| WO | 2008/137354 A1 | 11/2008 |
| WO | 2010/124228 A2 | 10/2010 |
| WO | 2013/023532 A1 | 2/2013 |

OTHER PUBLICATIONS

QUALCOMM Incorporated, "Assistance Information for MBMS UEs in RRC_IDLE mode", 3GPP Draft, R2-115104, 3rd Generation Partnership Project (3GPP), Oct. 10-14, 2011, pp. 1-3, vol. RAN WG2, XP050540796, Zhuhai, China.

Huawei et al., "How does the UE determine whether neighbor cells of the MNMS frequency can provide the services that it is interested to receive", 3GPP Draft, R2-114430, 3rd Generation Partnership Project (3GPP), Aug. 22-26, 2011, pp. 1/4-4/4, vol. RAN WG2, XP050552786, Athens Greece.

Huawei, "[75#35]—LTE: MBMS Service Continuity", 3GPP Draft; R2-115017 Summary of Email Dissussion 75#35 LTE-MBMS Serive Continuity, 3rd Generation Partnership Project (3GPP), Oct. 10-14, 2011, pp. 1-20, vol. RAN WG2, XP050540930, Zhuhai, China.

* cited by examiner

METHOD AND DEVICE FOR RECEIVING A MULTIMEDIA BROADCAST MULTICAST SERVICE IN A MOBILE COMMUNICATION SYSTEM

TECHNICAL FIELD

The present invention relates to a method and apparatus for receiving Multimedia Broadcast Multicast Service (MBMS) in a mobile communication system.

BACKGROUND ART

Mobile communication systems developed to provide the subscribers with voice communication services on the move. With the rapid advance of technologies, the mobile communication systems have evolved to provide high speed data communication services beyond the voice communication services.

Recently, as one of the next generation mobile communication system, Long Term Evolution (LTE) is on the standardization by the $3^{rd}$ Generation Partnership Project (3GPP). LTE is a technology designed to provide high speed packet-based communication of up to 100 Mbps and has been standardized almost currently.

In order to provide broadcast service in the mobile communication system, Multimedia Broadcast Multicast Service (MBMS) has been introduced. MBMS is a technology for broadcast of multimedia contents efficiently and allows the terminals to identify the MBMS frequency to receive the MBMS signals without report to the base station.

In order to achieve this, there is a need of a method and procedure for allowing the terminal to identify the frequency or cell providing the service which the user is interested.

DISCLOSURE OF INVENTION

Technical Problem

The present invent has been conceived to solve the above problem and aims to provide a method and procedure for a terminal to identify the frequency or cell providing the user-interested service.

Solution to Problem

In accordance with an aspect of the present invention, a Multimedia Broadcast Multicast Service (MBMS) reception method of a terminal in a mobile communication system includes determining whether a Service Area Identifier (SAI) of a serving cell is broadcast in progress of the MBMS, receiving, when the SAI of the serving cell is broadcast, the SAI of the serving cell, determining whether the SAI of the MBMS match the SAI of the serving cell, and changing, when the SAI of the MBMS matches the SAI of the serving cell, a cell reselection priority of a frequency of the serving cell to a highest priority.

In accordance with another aspect of the present invention, a Multimedia Broadcast Multicast Service (MBMS) reception apparatus of a terminal in a mobile communication system includes a controller which controls determining whether a Service Area Identifier (SAI) of a serving cell is broadcast in progress of the MBMS, receiving, when the SAI of the serving cell is broadcast, the SAI of the serving cell, determining whether the SAI of the MBMS match the SAI of the serving cell, and changing, when the SAI of the MBMS matches the SAI of the serving cell, a cell reselection priority of a frequency of the serving cell to a highest priority.

Advantageous Effects of Invention

The method and apparatus for receiving MBMS of the present invention makes it possible for the terminal to select the frequency or cell providing the interested service when MBMS starts so as to receive the MBMS efficiently.

MODE FOR THE INVENTION

Detailed description of well-known functions and structures incorporated herein may be omitted to avoid obscuring the subject matter of the present invention. Exemplary embodiments of the present invention are described with reference to the accompanying drawings in detail. Prior to the explanation of the present invention, LTE system and carrier aggregation is described briefly.

Figure 1:
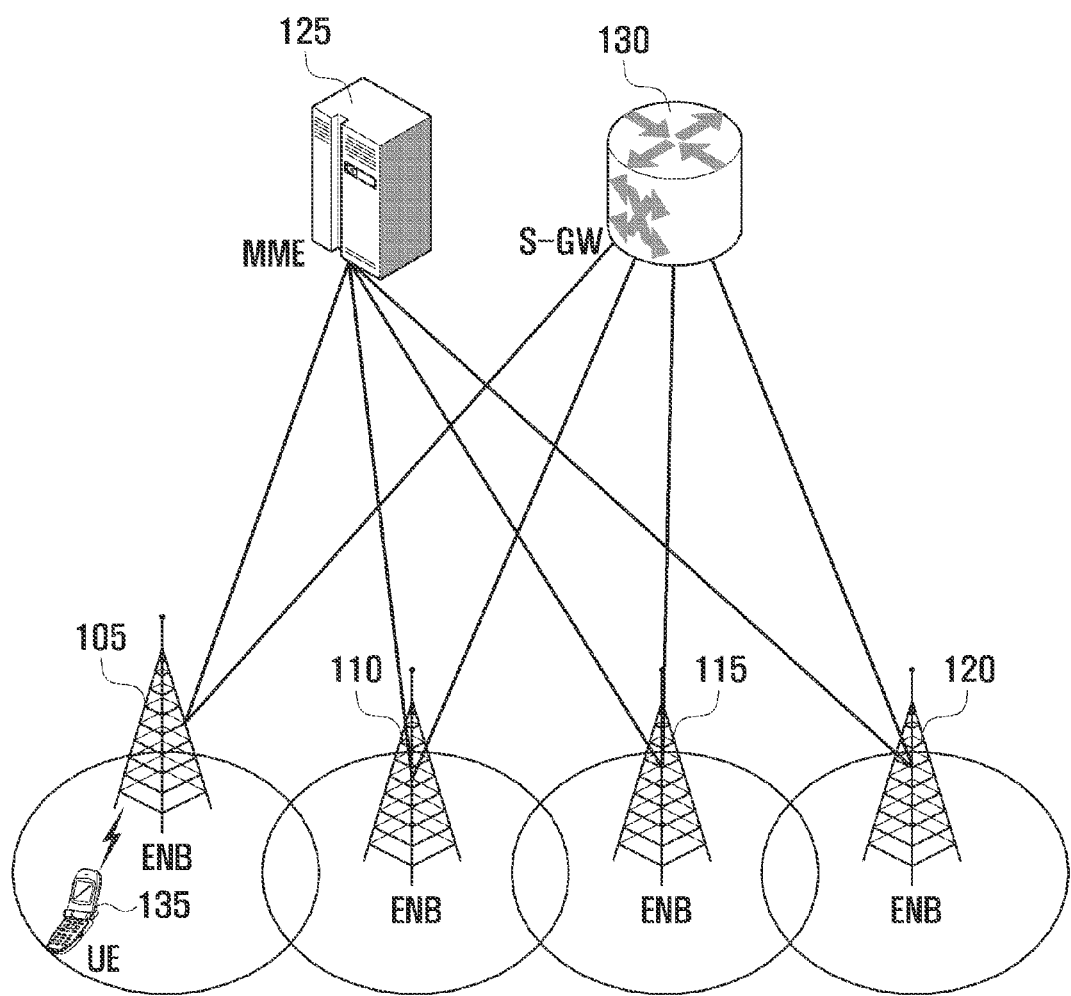
FIG. 1 is a diagram illustrating the architecture of an LTE system to which the present invention is applied.

FIG. 1 is a diagram illustrating the architecture of an LTE system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to the legacy node Bs of the UMTS system. The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
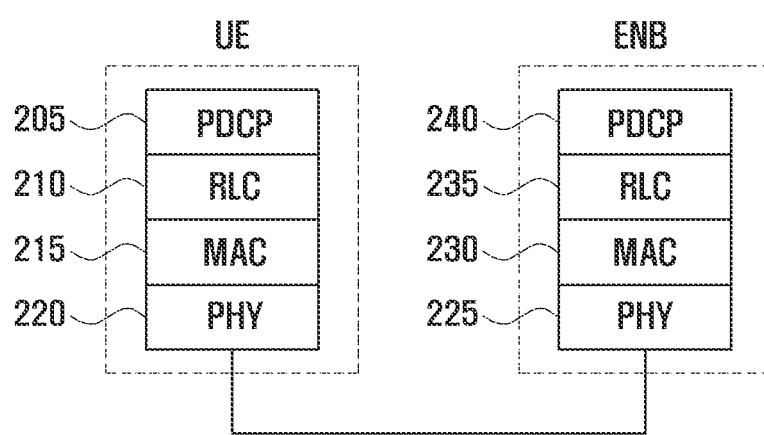
FIG. 2 is a diagram illustrating a protocol stack of the LTE system to which the present invention is applied.
Figure 3:
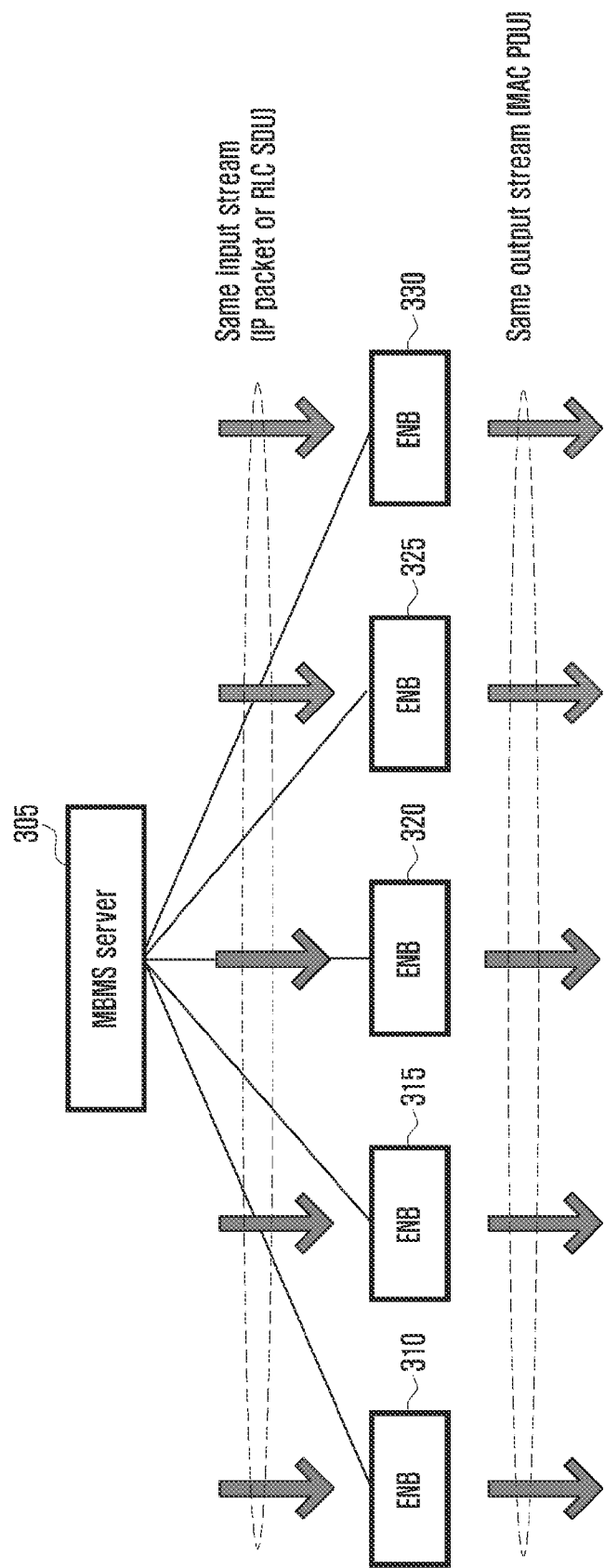
FIG. 3 is a diagram illustrating Multimedia Broadcast Multicast service (MBMS).

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

A description is made of MBMS briefly hereinafter.

The MBMS server 305 generates MBMS data to the eNBs 310, 315, 320, 325, and 330 participated in MBMS transmission. The eNBs store the data received from the MBMS server and transmit the data at a predetermined time. Since the same data are transmitted simultaneously, this gives an effect of amplifying the signal strength, and the UEs receiving the same signal from multiple eNBs can experience the high received signal quality as compared to the case of receiving the signal from one eNB. In order for the eNBs to transmit the same signal, there should be a few assumptions as follows.

First, the eNBs have to receive the same data. Secondly, the eNBs have to generate same data from the same data. Finally, the same data have to be transmitted on the same transmission resource simultaneously.

The neighbor eNBs transmit the same MBMS data, and some MBMS services are likely to be provided in a certain area. The area where a certain MBMS service is provided (or a set of cell or frequencies) is referred to as MBMS Service Area.

It is preferred that the UE in the idle mode camps on a frequency providing the MBMS service. This is because the UE camped on a non-MBMS frequency has to monitor the paging channel of the serving frequency while receiving the MBMS service on the MBMS frequency.

In order for the idle mode UE which is interested in or receiving the MBMS service currently to operate on the frequency providing MBMS (hereinafter, referred to as MBMS frequency), the MBMS interested UE has a capability of adjusting the cell reselection priority of the MBMS frequency. The UE operation concerning this is depicted in FIG. 4.

Figure 4:
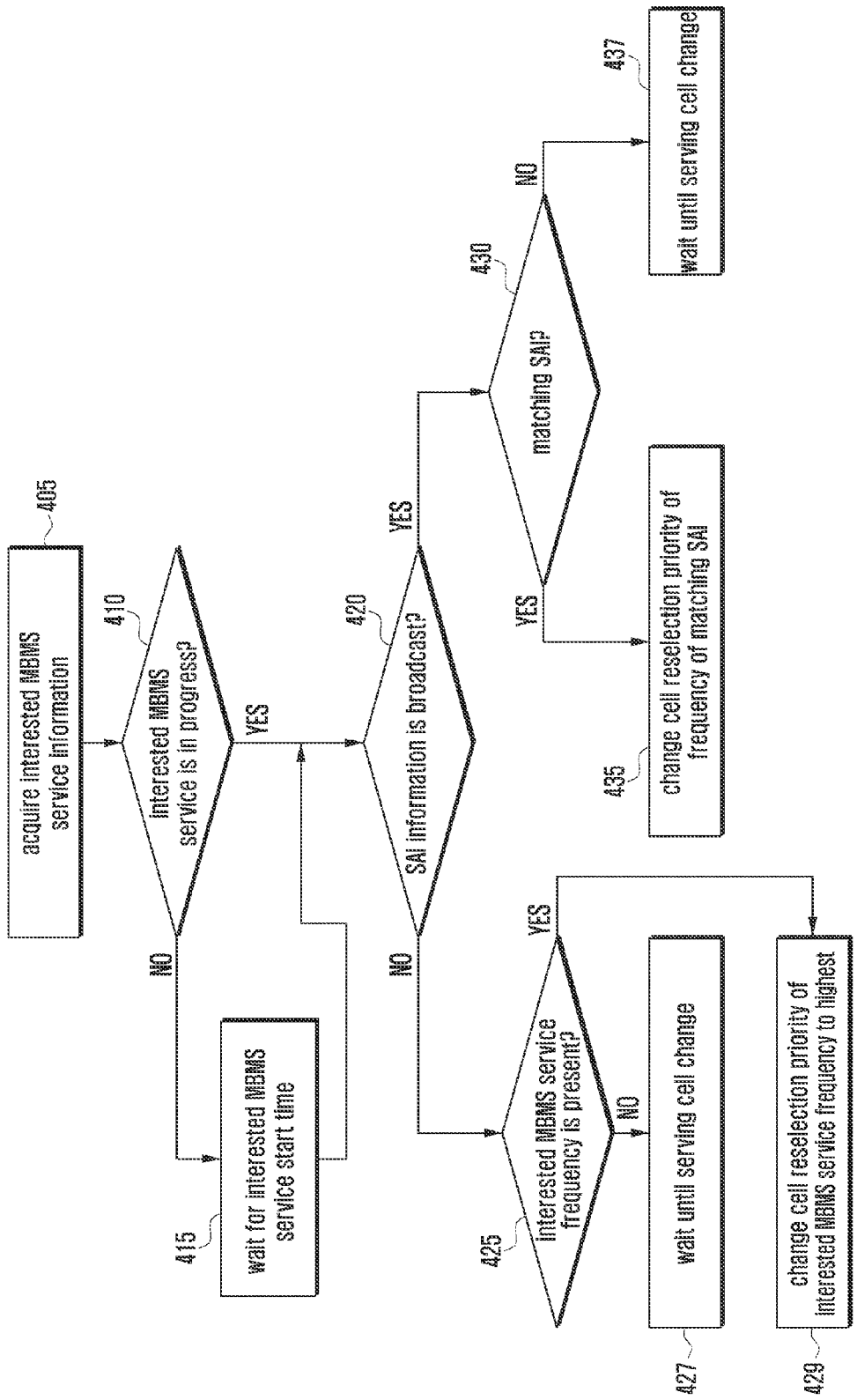
FIG. 4 is a flowchart illustrating a method of adjusting the cell reselection priority of the MBMS frequency in consideration of the interested MBMS service start time and Service Area ID (SAI) according to an embodiment of the present invention.

FIG. 4 is a flowchart illustrating a method of adjusting the cell reselection priority of the MBMS frequency in consideration of the interested MBMS service start time and Service Area ID (SAI) according to an embodiment of the present invention.

The UE acquires the service guide information including various informations concerning MBMS and checks the information on the UE interested MBMS service at step 405. The service guide information is provided by MBMS service provider, MBMS server, and MBMS service operator and may include the following informations per MBMS service.

Service Area ID (SAI): Identifier indicating the area where the corresponding MBMS service is provided. The SAI may be provided in the system information of the cell and, if the SAI of the UE-interested MBMS service matches the SAI broadcast in the system information, the UE determines that the corresponding MBMS service is provided in the corresponding cell (or on the corresponding frequency).

Frequency: Frequency on which the corresponding MBMS service is provided.

Service start time: Time when the service starts.

Afterward, the UE determines whether the interested MBMS service is in progress at step 410. If the interested MBMS service is in progress, i.e. if the current time is later than the service start time, the procedure goes to step 420. If the interested MBMS service is not started yet, i.e. if the current time is earlier than the service start time, the procedure goes to step 415. At step 415, the UE waits for the start time of the interested MBMS service, and the procedure goes to step 420 at or right before the service start time.

The UE determines whether the current serving cell broadcasts SAI information at step 420. If no SAI information is broadcast, the procedure goes to step 425 and, otherwise, step 430.

The SAI information is provided in a System Information Block (SIB) which may include the SAIs of neighboring frequencies as well as the current cell. Typically, SAI is provided by frequency and thus the serving cell SAI has the same meaning of the serving frequency SAI. For example, if there is a certain serving cell (frequency f1) and the neighboring frequencies f2, f3, and f4 on which f1 and f2 are used for MBMS, the SAIs of the serving cell and f2 may be broadcast in a certain SIB.

Assuming that the SIB carrying the SAI information is SIB X, the UE checks the SIB X of the serving cell to determine whether the SAI information is broadcast. If it is determined that the SIB X of the serving cell carries the SAI information, the procedure goes to step 430. If it is determine that the SIB X of the serving cell carries no SAI information or if no SIB X is broadcast, the procedure goes to step 425.

The reason why the network provides the SAI information is to indicate whether the UE-interested MBMS service is provided in the current area. For example, if the UE-interested MBMS service is provided in the Capital area and if the UE out of the Capital area may not receive the SAI of the interested MBMS service in the current area. Accordingly, the UE determines whether the interested MBMS service is provided in the current area based on the presence/absence of the SAI of the interested MBMS service and, if not the MBMS service area, suspends additional operation for receiving the MBMS service, e.g. adjustment of the cell reselection priority.

Depending on the Release of eNB, the SAI information may be provided or not. If the eNB is a REL-10 or earlier release eNB, this means that the SAI-related operation is not performed and thus the eNB does not broadcast SAI information. That is, SIB x is not broadcast. If the eNB is REL-11 or later release eNB, it broadcasts SAI information. That is, if the serving cell does not provide SAI information, it is impossible to determine whether the MBMS service is provided in the current area based on SAI. At this time, if the MBMS service frequency exists in the current area, the UE assumes that the MBMS service is provided in the corresponding area and performs follow-up operation.

If it is determined that the interested MBMS service frequency is present at step 425, the UE adjusts the cell reselection priority of the frequency to the highest value at step 429. If the interested MBMS service is not provided in a predetermined time since the cell of the interested MBMS service frequency is selected, the UE may recover the cell reselection priority to the original value. If it is determined that the interested MBMS service frequency is not present at step 425, the UE waits until the serving cell changes or the system information is changed or reacquired at step 427.

If the interested MBMS service frequency is present, this means that the serving frequency or neighboring frequency is the interested MBMS service frequency. The neighbor frequency is indicated in the system information of the serving cell.

The cell reselection priority is the priority allocated per frequency, and the UE selects the cell operating on the frequency having the high priority with priority. For example, if the channel quality of the frequency having the highest priority is better than the a predetermined threshold, the cell operating on the frequency having the highest priority is likely to be selected although the channel quality of the cell operating on another frequency is better. The cell reselection priority may be provided in the system information or sent from the eNB to the UE through a dedicated RRC message in releasing the RRC connection.

If it is determined that the ASI information is broadcast at step 420, the procedure goes to step 430. At step 430, the UE determines whether the SAI information includes the SAI matching the interested MBMS SAI. If the interested MBMS SAI is present, the procedure goes to step 435 and, otherwise if the interested MBMS SAI is absent, step 437.

At step 435, the UE adjusts the cell reselection priority of the frequency corresponding to the SAI matching the MBMS SAI (hereinafter, referred to interested SAI) to the highest value. If the SAI of the serving cell is the interested SAI, the interested SAI frequency is the serving frequency and, otherwise if the SAI of the neighbor frequency is the interested SAI, the interested SAI frequency is the neighbor frequency. If the interested MBMS service is not provided in a predetermined time after reselecting the cell of the interested SAI frequency, the UE recovers the cell reselection priority to the original value. The UE waits until the serving cell is changed or the system information is changed or reacquired at step 437.

Figure 5:
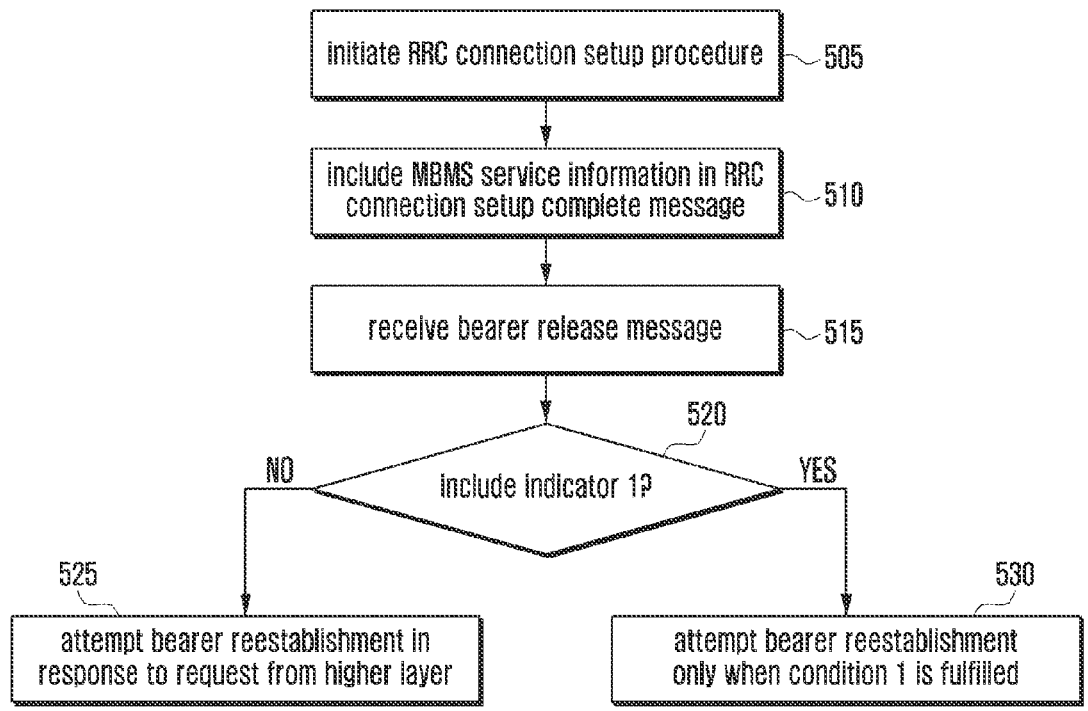
FIG. 5 is a flowchart illustrating a method for determining whether the UE attempts bearer reconfiguration after unicast bearer has been released due to the cell congestion according to an embodiment of the present invention.

FIG. 5 is a flowchart illustrating a method for determining whether the UE attempts bearer reconfiguration after unicast bearer has been released due to the cell congestion according to an embodiment of the present invention.

The idle mode UE may transition to the connected mode for a certain reason. After transitioning to the connected mode to receive the MBMS service, the UE has to provide the eNB with the information necessary for the MBMS service. In the present invention, the following informations (hereinafter, MBMS informations) are provided to the eNB.
frequency carrying interested MBMS service
information indicating priorities of MBMS and unicast service
information indicating whether current MBMS service is received per frequency
sum of data rates of MBMS services the UE is receiving or intends to receive The eNB triggers the handover of the UE to an appropriate frequency using the above informations such that the UE receives the MBMS service. Form the view point of the cell, the MBMS service may restrict the unicast service. Using a part of the limited radio resource for MBMS service decreases the radio resource amount for unicast service and thus increases the probability of cell congestion. If the cell congestion situation is defined as insufficient QoS for unicast service to the large amount of UEs, it is preferred to hand over the control of the UE to other cell from the view point of the eNB.

If it is more important for a UE to receive the MBMS service than the unicast service, it is preferred to release the unicast service bearer rather than perform handover of the UE. According to an embodiment, the UE reports the priorities of the MBMS service and unicast service in order for the eNB to operate in such a way. By discriminating between the situation of receiving the MBMS service and the situation of just being interested in receiving the MBMS service, i.e. by reporting whether the MBMS service is received per frequency, the eNB is capable of managing radio resource more efficiently.

In an alternative case, it is also possible to consider the start time of the interested MBMS service in reporting the interested MBMS service provision frequency. That is, the UE may configure the interested MBMS service provision frequency information as follows.

The UE reports the interested MBMS service frequency only when the MBMS start time has passed or is passing soon at the time of transitioning to the connected mode. In this case, since the UE is likely to be or start receiving the MBMS service on the reported frequency, it is not necessary to report whether the MBMS service is being received.

In the case that the eNB has released the unicast bearer of the UE which is receiving the MBMS service due to the cell congestion, it is preferred for the UE to refrain from attempting recovery of the unicast bearer. In the present invention, when transmitting the control message instructing bearer release to the UE, the eNB notifies the UE that the reason for the bearer release is the cell congestion caused by the MBMS service such that the UE controls the unicast bearer reestablishment procedure based on the bearer release reason.

Referring to FIG. 5, the UE initiates an RRC connection setup procedure at step 505. The RRC connection setup procedure is performed in such a way that the UE sends the eNB an RRC CONNECTION REQUEST message, the eNB sends the UE an RRC CONNECTION SETUP message, and the UE sends the eNB an RRC CONNECTION SETUP COMPLETE MESSAGE.

The RRC connection setup procedure is initiated with the request for connection setup from the higher layer of the RRC. The higher layer may request for RRC connection setup for performing Tracking Area update (TAU) or unicast bearer configuration. If the RRC connection setup completes, the higher layer sends the MME a TAU message or a bearer setup request message.

The UE transmits the RRC connection setup complete message including the MBMS information at step 510. If the interested MBMS service start time has passed or arrives immediately, the UE includes the interested MBMS service providing frequency information in the MBMS information. The MBMS information includes 'sum of data rates of MBMS services which the UE is receiving or intending to receive' which is the information necessary for preventing the sum of the unicast service data rates provided by the eNB from exceeding the processing capability of the UE.

Once the RRC connection setup has completed, the UE performs normal operations with the eNB, i.e. receives the unicast service through the established bearer, and measurements and handover according to the instruction of the eNB. As described above, if the service cell of the UE undergoes cell congestion, the eNB may release the unicast service bearer having the priority lower than that of the MBMS service. At this time, the eNB may send the UE a control message including an indicator indicating the bearer to be released. Afterward, the UE receives the control message instructing to release the radio data bearer at step 515. This control message may be the RRC CONNECTION RECONFIGURATION message. The radio data bearer release may be resulted from the cell congestion or normal radio resource management.

The UE determines whether the control message includes the indicator 1 at step 520. If the indicator 1 is not included, the procedure goes to step 525 and, otherwise of the indicator 1 is included, step 530.

The RRC device determines whether the control message includes a full configuration indicator and, if not, transfers the following informations to the higher layer at step 525.

Fact that DRB has released.
Identifier of higher layer bearer (Enhanced Packet System (EPS) bearer) connected to the released DRB)

The full configuration indicator is the indicator indicating that the eNB instructs the UE to perform the following operation.

Release all currently configured DRBs and reconfigure DRB according to the configuration information included in the control message.

The reason for performing the full configuration is because when the UE performs handover to an earlier release eNB the new eNB may not understand the current DRB configuration of the UE.

If the full configuration indicator is included, the UE notifies the higher layer of the information on the bearer which is not indicated by the reconfiguration information included in the control message among the released bearers. If the reconfiguration information on the released bearer is included in the control message, the above information is not delivered to the higher layer.

If it is detected that the DRB for a certain EPS bearer providing the unicast service has been released, the higher layer may request for EPS bearer reconfiguration according to the user's preference or initiate the procedure of requesting for release of EPS bearer.

At step 530, the UE attempts reestablishment of the DRB-released EPS bearer only when the following condition is fulfilled.

Congestion of the current cell is resolved.
The priority of unicast service is changed to be higher than that of MBMS service.

The information on whether the congestion of the current cell has been resolved is broadcast in a certain SIB. For example, if the Access Class Baring (ACB, see TS36.331) information of SIB 2 is broadcast, this indicates that the cell congestion continues and, otherwise if the ACB is not broadcast any more), this indicates that the congestion has been released.

At step 530, the UE may consider the congestion situation of the current cell and the priorities of the unicast service and MBMS service in determining whether to establish new EPS bearer afterward. That is, if the MBMS service is received with priority, the UE does not initiate the EPS bearer setup request procedure in the congestion situation of the cell.

Figure 6:
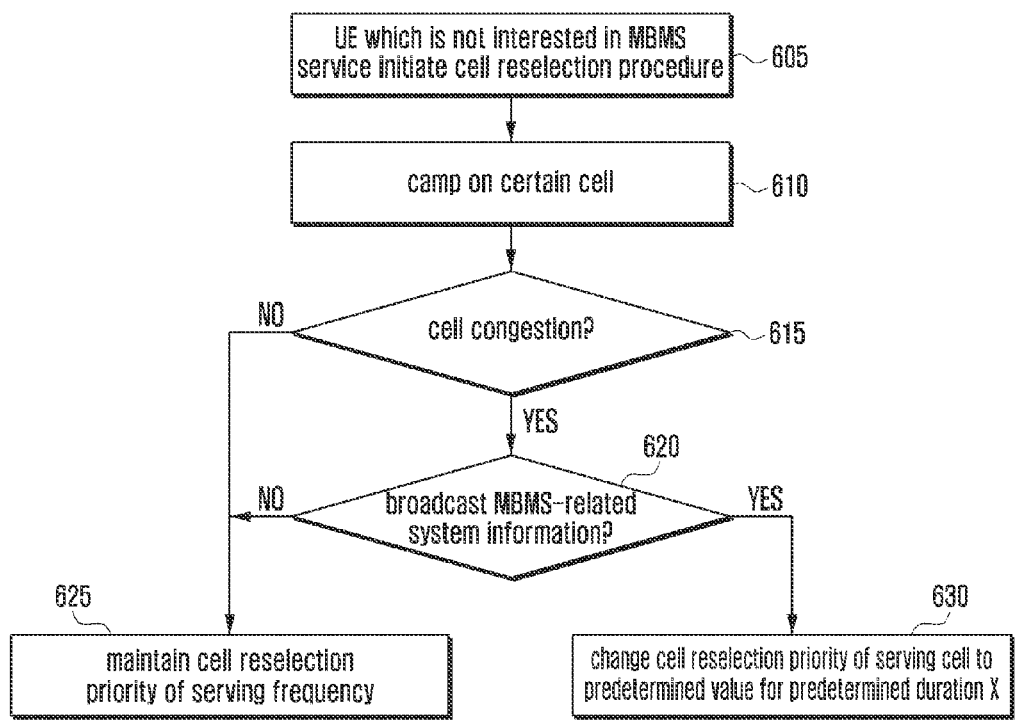
FIG. 6 is a flowchart illustrating a method for a UE non-interested in receiving MBMS to adjust the cell reselection priority of a cell providing MBMS according to an embodiment of the present invention.

FIG. 6 is a flowchart illustrating a method for a UE non-interested in receiving MBMS to adjust the cell reselection priority of a cell providing MBMS according to an embodiment of the present invention.

It is preferred that the UE which is not interested in the MBMS service does not camp on the cell which is in congested state and provides MBMS service. According to an embodiment of the present invention, the UE which is not interested in receiving MBMS adjusts the cell reselection priority of the frequency of the corresponding cell to drop the probability of camping on the corresponding cell.

Referring to FIG. 6, the UE which is not interested in receiving MBMS initiates cell reselection procedure at step 650. The cell reselection procedure is of comparing the channel qualities of the serving and neighbor cells to determine whether to camp on the neighboring cell fulfilling a predetermine condition. The cell which fulfills a predetermined channel quality condition and is not barring access is found, the UE camps on the corresponding cell at step 610. Afterward, the UE receives the system information from the new cell to acquire the information necessary for communication in the new cell. The UE also monitors the paging channel of the new cell.

The UE determines whether the cell is in the congestion state based on the system information at step 615. For example, if ACB information is broadcast, this means that the cell is in the congestion state. If it is determined that the cell is not in the congested state, the UE maintains the cell reselection priority of the current serving frequency without adjustment at step 625.

If it is determined that the cell is in the congestion state at step 615, the UE determines whether the MBMS-related system information is broadcast in the cell at step 620. The MBMS-related system information may include the information on the channel necessary for receiving the MBMS service, i.e. MBMS Control Channel (MCCH) configuration information. It may be any SAI-related information.

If it is determined that the MBMS-related system information is broadcast at step 620, the UE is aware that the cell provides the MBMS service in the congestion state. In this case, the UE adjusts the cell reselection priority of the current frequency, i.e. serving frequency, to a predetermined value for a predetermined duration at step 630. The predetermined value may be the smallest value. The predetermined duration may be of long enough, e.g. 300 seconds. By adjusting the cell reselection priority in this way, the UE is capable of dropping the probability of camping on the cell of the corresponding frequency for the predetermined duration.

Figure 7:
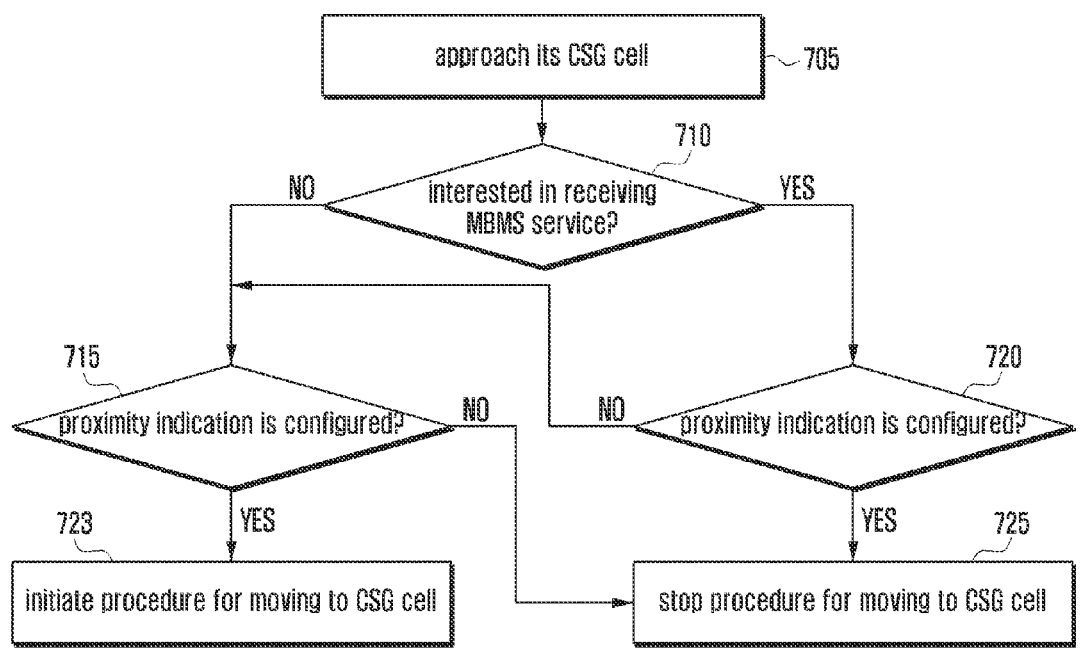
FIG. 7 is a flowchart illustrating a method for the UE which is interested in receiving MBMS to determine whether to transmit access notification message according to an embodiment of the present invention.

FIG. 7 is a flowchart illustrating a method for the UE which is interested in receiving MBMS to determine whether to transmit access notification message according to an embodiment of the present invention.

If the UE as a member of a Closed Subscriber Group (CSG) approaches a CSG cell, it transmits a control message called proximity notification message (Proximity Indication) to the eNB to perform handover to the CSG cell. The control message includes the frequency information of the CSG cell, and the eNB may configure frequency measurement to the UE to initiate the handover of the UE to the CSG cell.

If the CSG member UE which is receiving or intending to receive the MBMS service performs handover to the CSG cell, it may not receive the MBMS service. Accordingly, it is preferred that the UE which gives the higher reception priority to the MBMS service as compared to the unicast service does not initiate the procedure for handover to the CSG cell although it approaches the CSG cell. The UE operation is described with reference to FIG. 7.

The UE realizes its approach to the CSG cell area at step 705. For example, the UE memorizes the identifier of the macro cell overlapped with its CSG cell and, if it enters the macro cell, realizes that it has approached the CSG cell area. Also, it is possible to determine its approach to the CSG cell area using the RF fingerprint information of the CSG cell (channel quality information of neighbor cells).

Afterward, the UE determines whether it is interested in receiving the MBMS service at step 710 and, if not, the procedure goes to step 715 and, otherwise, step 720.

At step 715, the UE determines whether the proximity indication is configured and, if so, initiates a procedure of moving to its CSG cell at step 723, e.g. generates the proximity indication to the eNB. If no proximity indication is configured, the procedure goes to step 725.

The eNB notifies the UE whether the proximity indication is configured. For example, if the eNB notifies the UE of the configuration of proximity indication in or after the RRC connection setup procedure, this means that the proximity indication is configured to the corresponding cell. Unless the eNB notifies the UE of the configuration of proximity indication explicitly, this means that the proximity indication is not configured to the corresponding cell. The reason for this operation is to prevent the UE from transmitting the proximity indication to the eNB which does not support proximity indication because the proximity indication may be supported or not depending on the software release of the eNB.

The UE determines whether the MBMS service has priority compared to the unicast service at step 720. Or, the UE determines whether it has been reported that the MBMS service has priority compared to the unicast service in the current or later MBMS service reception without report on priority change since then. If it is determined that the MBMS service has priority compared to the unicast service, the procedure goes to step 715.

If it is determined that the MBMS service has priority compared to the unicast service, the UE does not move to the CSG cell and the procedure goes to step 725.

At step 725, the UE suspends the procedure for moving to the CSG cell until the following condition is fulfilled.

The UE stays in the CSG cell area, the proximity indication report is configured, and the priority of the unicast service is changed to be higher than that of the MBMS service.

In order to increase the data rate of the UE, a carrier aggregation of aggregating a plurality of serving cells for one UE is introduced. A description is made of the carrier aggregation briefly with reference to FIG. 8.

Figure 8:
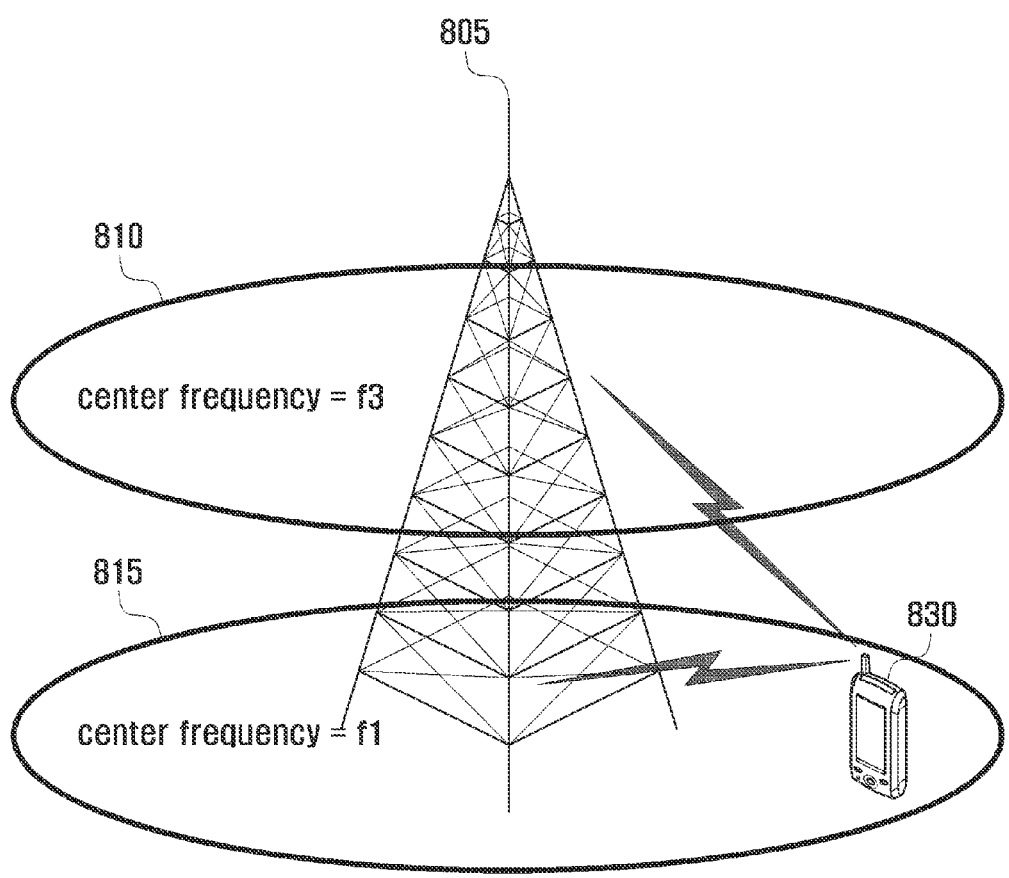
FIG. 8 is a diagram illustrating carrier aggregation.

FIG. 8 is a diagram illustrating carrier aggregation.

Referring to FIG. 8, an eNB transmits and receives signals through multiple carriers across a plurality of frequency bands. For example, when the eNB 805 transmits signals on the carrier 813 with the downlink center frequency f1 and the carrier 810 with the downlink center frequency 815, the UE transmits/receives data using one of the two carriers in the conventional system. However, the UE having the carrier aggregation capability may transmit/receive data using a plurality of carriers simultaneously. The eNB 805 allocates more carriers to the UE 830 having the carrier aggregation capability so as to increase the data rate of the UE 830. Aggregating the downlink or uplink carriers for transmitting or receiving signals is referred to as carrier aggregation.

The terms used frequently in the following description are explained hereinafter.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. Particularly in the present invention, the carrier aggregation is expressed in such a phrase as "a plurality of serving cells are configured" along with the terms "primary serving cell (PCell)," "secondary serving cell (SCell)," and "activated serving cell." These terms have the same meanings as used in the LTE mobile communication system and detailed definitions thereof are specified in TS 36.331 and TS 36.321. Also, the terms "timeAlignmentTimer," "Activation/Deactivation MAC Control Element," and "C-RNTI MAC CE" used in the present invention are specified in TS 36.321.

Figure 9:
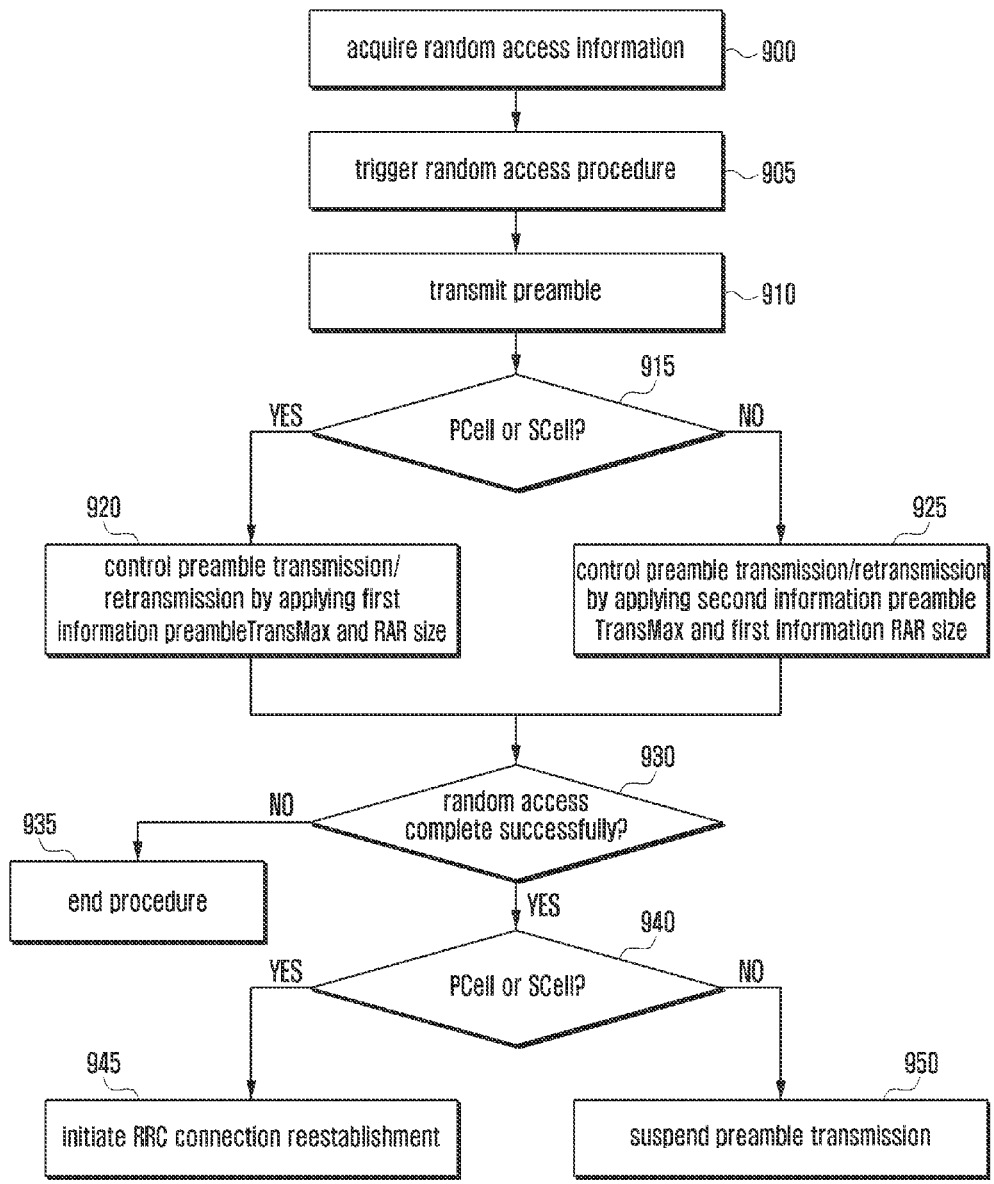
FIG. 9 is a flowchart illustrating a method for the UE configured with a plurality of serving cells to perform random access according to an embodiment of the present invention.

FIG. 9 is a flowchart illustrating a method for the UE configured with a plurality of serving cells to perform random access according to an embodiment of the present invention.

The UE configured with a plurality of serving cells may transmit a preamble in the PCell or a SCell in the random access procedure. The random access procedure may be performed for various reasons and, in most cases, the UE transmits the preamble in the PCell. In predefined cases (e.g. when the eNB instructs the UE to transmit the preamble in a specific SCell), however, the UE transmits the preamble in the SCell. In the case that the eNB intends to check the uplink transmission timing in a certain SCell, the eNB may instruct the UE to perform the random access procedure.

In an embodiment of the present invention, the UE performs the random access procedure distinctly depending on whether the preamble is transmitted in the PCell or the SCell.

The UE operation is described with reference to FIG. 9.

The UE first acquires random access information at step 900. The random access information may include followings.

Maximum number of preamble transmissions (preambleTransMax): Maximum number of preamble transmissions in the random access operation of the UE before starting a predetermined operation. The predetermined operation may be the RRC connection reestablishment. The eNB sets the preambleTransMax to an appropriate value to prevent the preamble from being transmitted infinitely.

Random access response window size (ra-ResponseWindowSize): The random access response window is the maximum duration for which the UE which has transmitted the preamble wait for receiving the Random Access Response (RAR) message. If no RAR is received before the expiry of the random access response window, the UE may retransmit the preamble.

The UE which has not perform handover after RRC connection establishment in a certain cell is capable of acquiring the random access information in one of the following two ways.

Acquiring from the system information

Acquiring from a dedicated RRC control message. The dedicated RRC control message may be the RRC Connection Reconfiguration message which instructs the SCell configuration but does not command handover.

In the following description, the random access information acquired through the first method is referred to as random access information 1 and the random access information acquired through the second method is referred to as random access information 2. That is, The UE may have the random access information as follows at a certain time point.

First preambleTransMax, First ra-ResponseWindowSize

Second preambleTransMax, Second ra-ResponseWindowSize

The first preambleTransMax and the first ra-ResponseWindowSize are acquired from the system information of the PCell, and the second preambleTransMax and the second ra-ResponseWindowSize are given through a predetermined dedicated RRC message.

The random access procedure is triggered at step 905. If the data having the high priority occurs in the UE or if the eNB instructs to perform random access, the UE triggers the random access procedure. The UE transmits the preamble in a predetermined serving cell at step 910 and determines whether the serving cell in which it has transmitted the preamble is the PCell or SCell. If it is the PCell, the procedure goes to step 920 and, otherwise if it is the SCell, step 925.

The UE controls the preamble transmission and retransmission by applying the first preambleTransMax and the first ra-ResposneWindowsize at step 920 and by applying the second preambleTransMax and the second ra-ResposneWindowsize at step 925.

Controlling the preamble transmission and retransmission process using the preambleTransMax and ra-ResponseWindowSize has the meaning as follows.

The UE monitors to determine whether a valid RAR message is received for the RAR window after transmitting the preamble. If no valid RAR message is received before the RAR window expires, the UE increases the transmit power as much as predetermined amount and retransmits the preamble. In the normal case, the eNB receives the preamble transmitted by the UE at any time and transmits the RAR message as reply. However, the channel condition of the UE may be significantly bad or the eNB cannot transmit the RAR message to the UE due to preamble congestion to the eNB. In this case, if the number of preamble transmissions reaches preambleTransMax, the UE performs a predetermined tapering operation, e.g. stopping preamble transmission or reestablishing RRC connection. Controlling the preamble transmission and retransmission means determining a preamble retransmission timing and whether to retransmit preamble by applying preambleTransMax and ra-ResposneWindowSize.

The reason for applying the second random access information when the UE transmits the preamble in the SCell at step 925 is to make it possible for the UE to perform random access without acquiring the system information from the SCell. If the UE has to acquire the system information in the SCell, it has to acquire the system information before starting data communication in the SCell, resulting in delay.

At step 925, the preamble transmission and retransmission process may be controlled by applying the second preambleTransMax and the first ra-ResponseWindowSize instead of the second preambleTransMax and the second ra-ResponseWindowSize.

Afterward, the UE determines whether the random access procedure has completed successfully before the number of preamble transmissions reaches the preambleTransMax at step 930. If the random access procedure has completed successfully before the number of preamble transmission reaches the preambleTransMax, the UE ends the procedure at step 935. If the random access procedure has not completed successfully before the number of preamble transmission reaches the preambleTransMax, the UE determines whether the preamble has been transmitted in the PCell or SCell at step 940. If the preamble has been transmitted in the PCell, the UE initiates the RRC connection reestablishment at step 945. If the preamble has been transmitted in the SCell, the UE stops preamble transmission at step 950.

If the preamble has been transmitted in the SCell, the preambleTransMax is determined by applying the preambleTransMax parameter signaled to the corresponding cell while the RAR window size is determined as the value defined for the PCell, i.e. the value broadcast through the system information of the PCell. This is because although it is preferred to determine the preambleTransMax by applying the state of the cell in which the preamble is transmitted, i.e. although the difference of the value may be great depending on the cell in which the preamble is transmitted, the RAR window size, as the parameter for defining the duration for the UE to try receiving the RAR, has no large difference between the cells.

The UE controls the preamble transmission and RAR reception operations by applying the selected parameters and, if it fails to receive RAR even though the preamble has transmitted as many as preambleTransMax or if the random access procedure has not completed successfully, performs a necessary follow-up operation. The follow-up operation is also defined differently depending on the cell in which the UE has transmitted the preamble. If the preamble has been transmitted in the PCell and if the random access fails before the number of preamble transmission reaches the preambleTransMax, the UE determines that there is significant connection problem with the current PCell and initiates the RRC connection reestablishment procedure at step 945. The RRC connection reestablishment procedure is specified in 36.331 in detail.

If the preamble has been transmitted and if the random access fails before the number of preamble transmissions reaches the preambleTransMax, the UE determines that there is significant connection problem with the SCell and stops preamble transmission at step 950. In this case the UE does not perform the RRC connection reestablishment procedure because it has no connection problem in the PCell although there is a connection problem with the SCell. For reference, if there is a connection problem with the PCell, the normal communication is impossible in spite of no connection problem with the SCell but, in the opposite case, it is possible to continue communication through the PCell.

Figure 10:
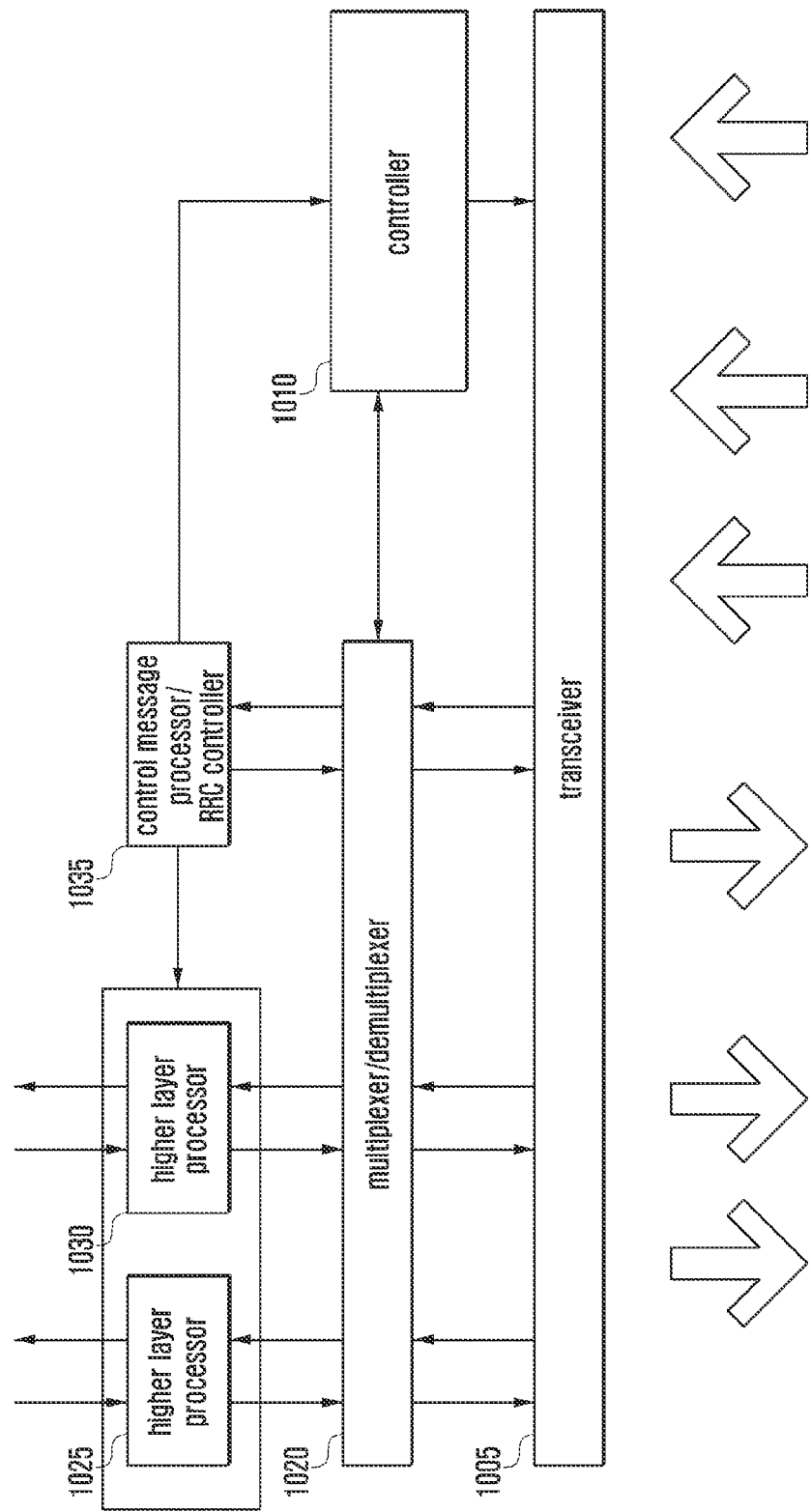
FIG. 10 is a block diagram illustrating a configuration of the UE according to an embodiment of the present invention.

FIG. 10 is a block diagram illustrating a configuration of the UE according to an embodiment of the present invention.

Referring to FIG. 10, the UE according to an embodiment of the present invention includes a transceiver 1005, a controller 1010, a multiplexer/demultiplexer 1015, a control message processor/RRC controller 1030, and higher layer processors 1020 and 1025.

The transceiver 1005 receives data including MBMS and control signals through the downlink channel of a serving cell and transmits data and control signals through the uplink channel. In the case that a plurality of serving cells are configured, the transceiver 1005 transmits/receives data and control signals through a plurality serving cells.

The multiplexer/demultiplexer 1015 multiplexes the data generated by the higher layer processors 1020 and 1025 and the control message processor 1030 and demultiplexes the data received by the transceiver 1005 to deliver the demultiplexed signal to the higher layer processors 1020 and 1025 and the control message processor 1030.

The control message processor 1030 is an RRC layer device and processes the control message received from the eNB to take a necessary action. For example, if the system information is received from the eNB, the control message processor 1030 transfers the related information to the controller. It transfers the cell reselection priority information received from the eNB to the controller.

The higher layer processors 1020 and 1025 may be implemented per service. The higher layer processor processes the data generated by the user service such as File Transfer Protocol (FTP) and Voice over Internet Protocol (VoIP) and transfers the processed data to the multiplexer/demultiplexer 1015 and processes the data from the multiplexer/demultiplexer 1015 and transfers the processed data to the service applications of the higher layer. The higher layer processor may include RLC layer device, PDCP layer device, and IP layer device.

The control unit 1010 checks the scheduling command, e.g. uplink grants, received by the transceiver 1005 and controls the transceiver 1005 and multiplexer/demultiplexer 1015 to perform uplink transmission with appropriate transmission resource at appropriate time. The controller may perform the operations proposed in FIGS. 4, 5, 6, 7, and 9. That is, the controller may adjusts the cell reselection priority appropriately and control the bearer reconfiguration procedure and random access procedure.

Figure 11:
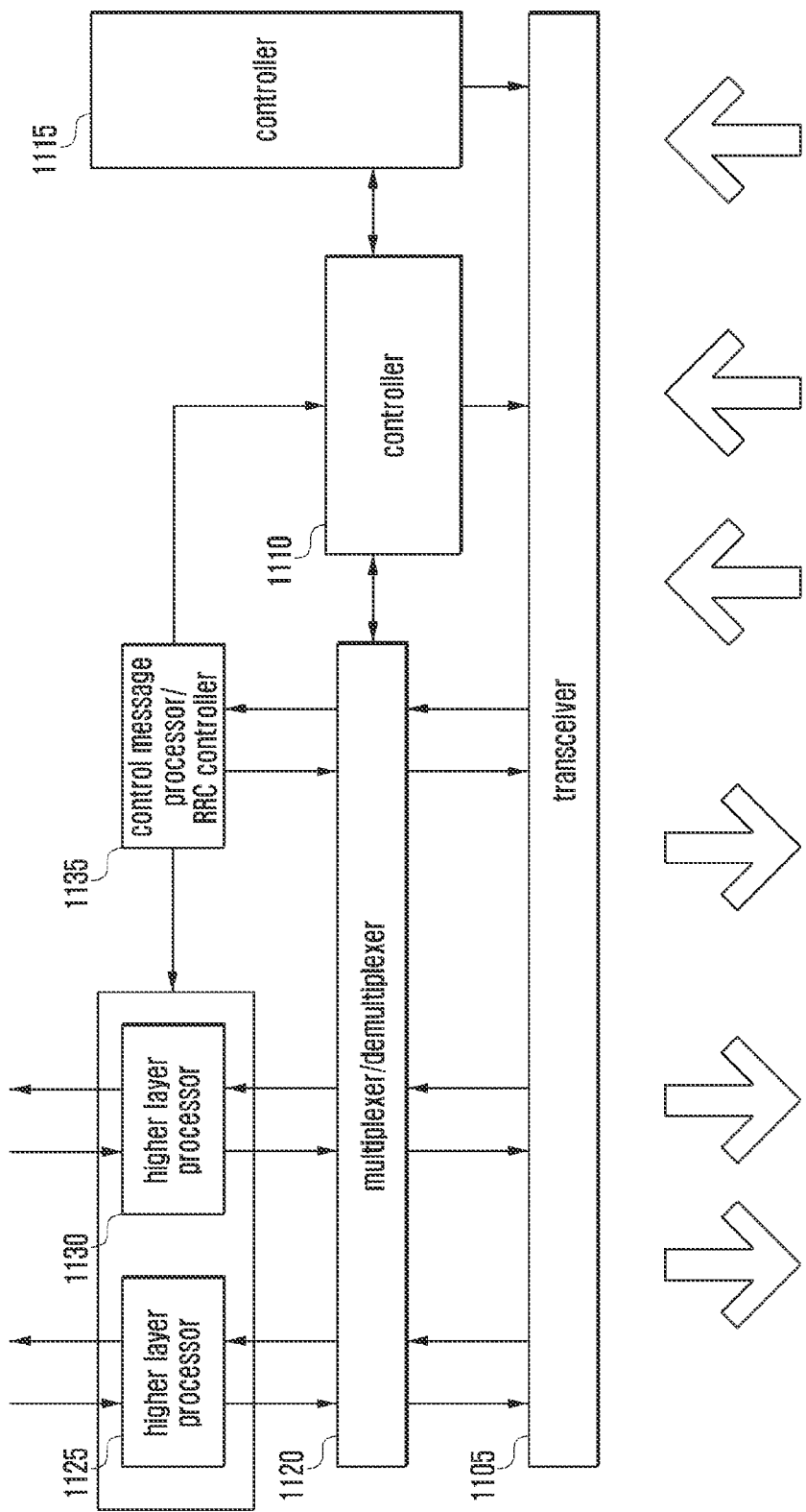
FIG. 11 is a block diagram illustrating a configuration of the eNB according to an embodiment of the present invention.

FIG. 11 is a block diagram illustrating a configuration of the eNB according to an embodiment of the present invention.

Referring to FIG. 11, the eNB includes a transceiver 1105, a controller 1110, a multiplexer/demultiplexer 1120, a control message processor/RRC controller 1135, higher layer processors 1125 and 1130, and a scheduler 1115.

The transceiver 1105 transmits data and control signals on the downlink carriers and receives data and control signals on the uplink carriers. In the case that a plurality of carriers are configured, the transceiver 1105 transmits and receives data and control signals on the multiple carriers.

The multiplexer/demultiplexer 1120 multiplexes the data generated by the higher layer processors 1125 and 1130 and the control message processor 1135 and demultiplexes the data received by the transceiver 1105 and delivers the demultiplexed data to appropriate higher layer processors 1125 and 1130, the control message processor 1135, and the controller 1110. The control message processor 1135 processes the control message transmitted by the UE to take a necessary operation and generates the control message to be transmitted to the UE to the low layers.

The higher layer processor 1125 and 1130 may be implemented per bearer processes the data to be transferred to the SGW or another eNB into RLC PDUs and transfers the RLC PDUs to the multiplexer/demultiplexer 1120 or processes the RLC PDUs from the multiplexer/demultiplexer 1120 to generate PDCP SDUs to the SGW or another eNB.

The scheduler allocates transmission resource to the UE at an appropriate time in consideration of the buffer state and channel state of the UE and controls the transceiver to process the signal to be transmitted to the UE and received from the UE.

The controller may perform the control operations concerning the eNB operations proposed in FIGS. 4, 5, 6, 7, and 9. For example, the control unit configures the cell reselection priority to the UE and whether to transmit proximity indication and controls the operation of transmitting RAR message to the UE in the RAR window.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for receiving multimedia broadcast multicast service (MBMS) by a terminal in a mobile communication system, the method comprising:
   obtaining MBMS information including at least one MBMS service area identifier (SAI);
   receiving a service area identifier (SAI) of a serving cell through a system information block (SIB);
   determining whether the SAI of the serving cell corresponds to an MBMS SAI included in the MBMS information;
   configuring a cell reselection priority of a frequency corresponding to the SAI of the serving cell to a highest priority if the SAI of the serving cell corresponds to the MBMS SAI included in the MBMS information, and
   performing cell reselection based on the cell reselection priority in a radio resource control (RRC) idle state.

2. The method of claim 1, further comprising:
   configuring a cell reselection priority of a frequency included in the MBMS information to the highest priority if the SAI of the serving cell is not transmitted.

3. The method of claim 2, further comprising waiting, if the frequency in the MBMS information is absent, until the serving cell changes.

4. The method of claim 1, further comprising waiting, if the SAI of the serving cell does not correspond to the MBMS SAI included in the MBMS information, until the serving cell changes.

5. A terminal for receiving multimedia broadcast multicast service (MBMS) in a mobile communication system, the terminal comprising:
   a transceiver configured to transmit and receive a signal; and
   a controller configured to:
      obtain MBMS information including at least one MBMS service area identifier (SAI),
      receive a service area identifier (SAI) of a serving cell through a system information block (SIB),
      determine whether the SAI of the serving cell corresponds to an MBMS SAI included in the MBMS information,
      configure a cell reselection priority of a frequency corresponding to the SAI of the serving cell to a highest priority if the SAI of the serving cell corresponds to the MBMS SAI included in the MBMS information, and
      perform cell reselection based on the cell reselection priority in a radio resource control (RRC) idle state.

6. The terminal of claim 5, wherein the controller is further configured to configure a cell reselection priority of a frequency included in the MBMS information to the highest priority if the SAI of the serving cell is not transmitted.

7. The terminal of claim 6, wherein the controller is further configured to wait, if the frequency in the MBMS information is absent, until the serving cell changes.

8. The terminal of claim 5, wherein the controller is further configured to wait, if the SAI of the serving cell does not correspond to the MBMS SAI included in the MBMS information, until the serving cell changes.

* * * * *